(12) United States Patent
Glahe

(10) Patent No.: US 10,084,300 B1
(45) Date of Patent: Sep. 25, 2018

(54) INTEGRATED ELECTRICAL OUTLET COVER AND SUPPORT FOR VOICE-CONTROLLED ASSISTANTS, SPEAKERS, AND OTHER ELECTRONIC DEVICES

(71) Applicant: ABCR, Inc., Denver, CO (US)

(72) Inventor: Charles D. Glahe, Denver, CO (US)

( * ) Notice: Subject to any disclaimer, the term of this patent is extended or adjusted under 35 U.S.C. 154(b) by 0 days.

(21) Appl. No.: 15/887,227

(22) Filed: Feb. 2, 2018

(51) Int. Cl.
| | |
|---|---|
| *H02G 3/14* | (2006.01) |
| *F16M 13/02* | (2006.01) |
| *H01R 25/00* | (2006.01) |
| *H01R 24/30* | (2011.01) |
| *H01R 24/60* | (2011.01) |
| *H02G 3/10* | (2006.01) |

(52) U.S. Cl.
CPC .............. *H02G 3/14* (2013.01); *F16M 13/02* (2013.01); *H01R 24/30* (2013.01); *H01R 24/60* (2013.01); *H01R 25/006* (2013.01); *H02G 3/10* (2013.01)

(58) Field of Classification Search
CPC . H01B 17/22; H02G 3/14; H02G 3/18; H02G 3/10; H01R 24/60; H01R 24/30; H01R 25/006
USPC ...................................................... 174/66, 67
See application file for complete search history.

(56) References Cited

U.S. PATENT DOCUMENTS

| | | | | |
|---|---|---|---|---|
| 3,621,115 A | * | 11/1971 | Kolster ................. | H01R 13/447 174/67 |
| 5,571,023 A | * | 11/1996 | Anthony .................. | H02G 3/14 220/242 |
| 7,674,977 B1 | * | 3/2010 | Constantino ............. | H02G 3/14 174/53 |
| 7,812,257 B2 | | 10/2010 | Gunderman et al. | |
| 9,551,454 B2 | | 1/2017 | Lipke et al. | |
| 2011/0132634 A1 | | 6/2011 | Fetzer-Westmeister | |
| 2015/0129722 A1 | | 5/2015 | Green | |
| 2015/0281815 A1 | | 10/2015 | Rip et al. | |
| 2015/0340826 A1 | | 11/2015 | Chien | |

OTHER PUBLICATIONS

The Original Outlet Wall Mount Hanger Stand for Home Voice Assistants No Messy Wires or Screws Dot Accessories, Wall Mount Stand Holder Stand Bracket for All-New Echo Dot 2nd Generation; 2018: https://www.amazon.com/dp/B0789CMLPR/ref=sspa_dk_detail_3?psc=1&pd_rd_i=B0789CMLPR&pd_rd_wg=V6u7i&pd_rd_r=6KQ84C07SJQPHEZ221VN&pd_rd_w=byy4f.

(Continued)

*Primary Examiner* — Dhirubhai R Patel
(74) *Attorney, Agent, or Firm* — Shifrin Patent Law; Dan Shifrin

(57) ABSTRACT

An integrated electrical outlet cover and device support is provided, comprising a frame mountable to an electrical outlet box around an electrical outlet and a device support affixed to one edge of the frame. The device support comprises a circular base having a front surface co-planar with a front surface of the frame and a sidewall extending outward from a perimeter of the front surface of the base. A device, such as a voice-controlled assistant, speaker, or other electronic device, is retainable within the support and may be plugged into a USB port in the electrical outlet. In various configurations, the unit may be retain such voice-controlled assistants as an Amazon Echo Dot or a Google Home Mini, among others.

3 Claims, 4 Drawing Sheets

(56) References Cited

OTHER PUBLICATIONS

EchoGear Outlet Shelf; 2018: https://www.amazon.com/ECHOGEAR-Outlet-Shelf-Space-Saving-Built/dp/B06XPJP32R/ref=pd_sim_196_2?_encoding=UTF8&pd_rd_i=B06XPJP32R&pd_rd_r=6KQ84C07SJQPHEZ221VN&pd_rd_w=0uVvg&pd_rd_wg=V6u7i&psc=1&refRID=6KQ84C07SJQPHEZ221VN.
CloverTale Home Outlet Wall Mount Holder for Alexa Echo Dot, Bose, Anker, Home Mini round speakers; 2018: https://www.amazon.com/CloverTale-Outlet-Holder-speakers-Accessories/dp/B0769D6G65/ref=pd_sbs_485_5?_encoding=UTF8&pd_rd_i=B0769D6G65&pd_rd_r=JHMGWEHMT0YSBHHMKV5Q&pd_rd_w=VOyrr&pd_rd_wg=qSCIX&psc=1&refRID=JHMGWEHMT0YSBHHMKV5Q.
CloverTale Outlet Wall Mount Holder Stand for Alexa Echo Dot, Home Mini by Google Round Speaker Accessories; 2018: https://www.amazon.com/dp/B078PGZVBM/ref=sspa_dk_detail_3?psc=1&pd_rd_i=B078PGZVBM&pd_rd_wg=2ZOSc&pd_rd_r=GQBB6416M5AA82T0Z6KJ&pd_rd_w=37tEg.
Outlet Wall Mount Hanger Stand Bracket for Amazon Echo Dot 2nd Without Mess Wires or Screws, Dot Accessories, Compact Holder Case Plug in Kitchens, Bathroom and Bedroom; 2018: https://www.amazon.com/Bracket-Without-Accessories-Kitchens-Bathroom/dp/B0763TW3B7/ref=sr_1_5?s=home-garden&ie=UTF8&qid=1517341839&sr=1-5&keywords=echo+dot+stands.
This Dottie—Plug-in Mount—Amazon Echo Dot 2nd Generation Accessory; 2018: https://www.amazon.com/This-Dottie-Plug-Generation-Engineered/dp/B074NVNNKF/ref=pd_sim_485_14?_encoding=UTF8&pd_rd_i=B074NVNNKF&pd_rd_r=P0SSHN3P7B9C86EW8JV1&pd_rd_w=tlTF1&pd_rd_wg=TKTTC&psc=1&refRID=P0SSHN3P7B9C86EW8JV1.
The Mini Back Pack: The First Simplest and Cleanest High-End Outlet Wall Mount Hanger Stand for Home Mini Voice Assistants by Google; 2018: https://www.amazon.com/Mini-Back-Pack-Simplest-Assistants/dp/B078JZFBBK/ref=pd_sbs_196_1?encoding=UTF8&pd_rd_i=B078JZFBBK&pd_rd_r=9WSH8VGPEBGBYNBPK31N&pd_rd_w=4WIDF&pd_rd_wg=t25SE&psc=1&refRID=9WSH8VGPEBGBYNBPK31N.

\* cited by examiner

INTEGRATED ELECTRICAL OUTLET COVER AND SUPPORT FOR VOICE-CONTROLLED ASSISTANTS, SPEAKERS, AND OTHER ELECTRONIC DEVICES

TECHNICAL FIELD

The present invention relates generally to electrical outlet covers and, in particular, to an outlet cover with an integrated device support.

BACKGROUND ART

Recent technological innovations have produced wireless speakers, and voice-controlled assistants, among other devices. Moreover, such devices have been miniaturized to such an extent that many now require very little space. The Alexa-based Amazon Echo Dot and the Google Home Mini are two such devices. While these and other devices may be battery powered, they do need occasional recharging. And, if they need a constant power source, they must be plugged in all of the time. Typically, the user connects the device to a charger plugged into an electrical wall socket. One end of a flexible cable with, for example, a standard USB connector, plugs into the charge and the other end with, for example, a mini USB connector, plugs into the device.

The small footprint of the electronic devices allows them to be placed on a shelf, table, counter, or other horizontal surface, often permanently or semi-permanently plugged in to a charger using the USB cable. Some may also be placed in a bracket secured to a wall using, for example, an adhesive or screws. For aesthetics, safety, or convenience, it is often desirable that any excess length of even a short USB cable be coiled or hidden.

Some device holders have been designed to make it easier to allow an electronic device to be located close to a wall-mounted electrical outlet. One such holder provides a small shelf above the outlet on which the device may be placed. Another holder provides a rigid pocket that fits onto pegs protruding through an opening in a wall plate next to an opening through which the outlet is accessible. Still another holder hangs from a charger that is plugged into an outlet. With all such holders, a USB cable connects the electronic device to a charger.

SUMMARY OF THE INVENTION

Embodiments of the present invention provide an integrated electrical outlet cover and device support ("unit"). The unit comprises a frame mountable to an electrical outlet box around an electrical outlet and a device support affixed to one edge of the frame. The device support comprises a circular base having a front surface co-planar with a front surface of the frame and a sidewall extending outward from a perimeter of the front surface of the base. A device, such as a voice-controlled assistant, speaker, or other electronic device, is retainable within the support and may be plugged into a USB port in the electrical outlet using, for example, a right-angle USB connector. In various configurations, the unit may be retain such voice-controlled assistants as an Amazon Echo Dot or a Google Home Mini, among others.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 2:
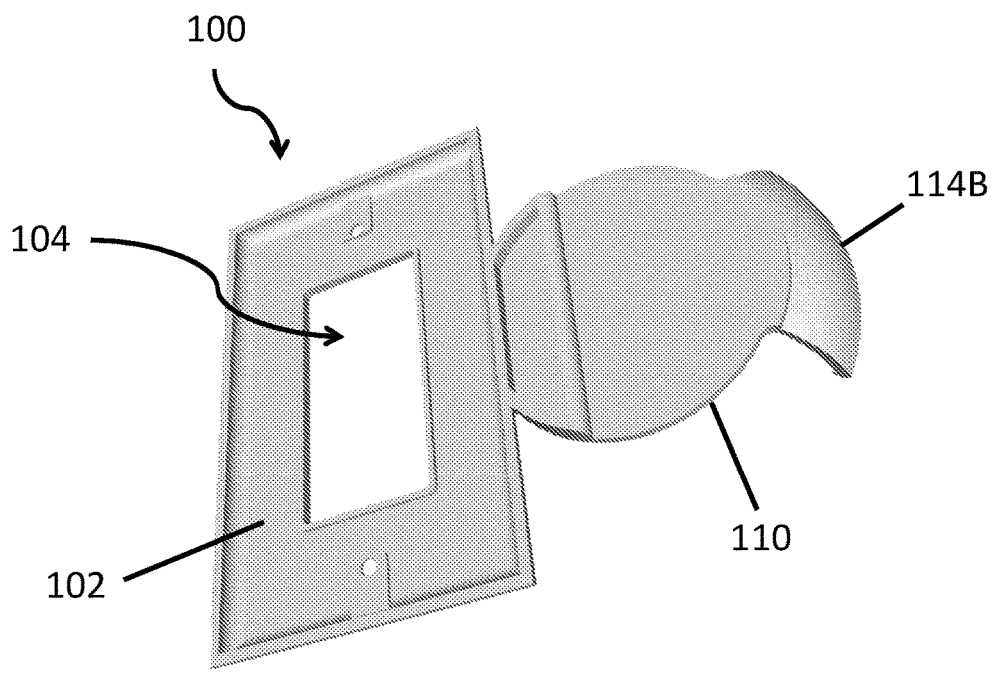
FIG. 2 illustrates a rear perspective view of the integrated outlet cover and device support of FIG. 1.
Figure 3:
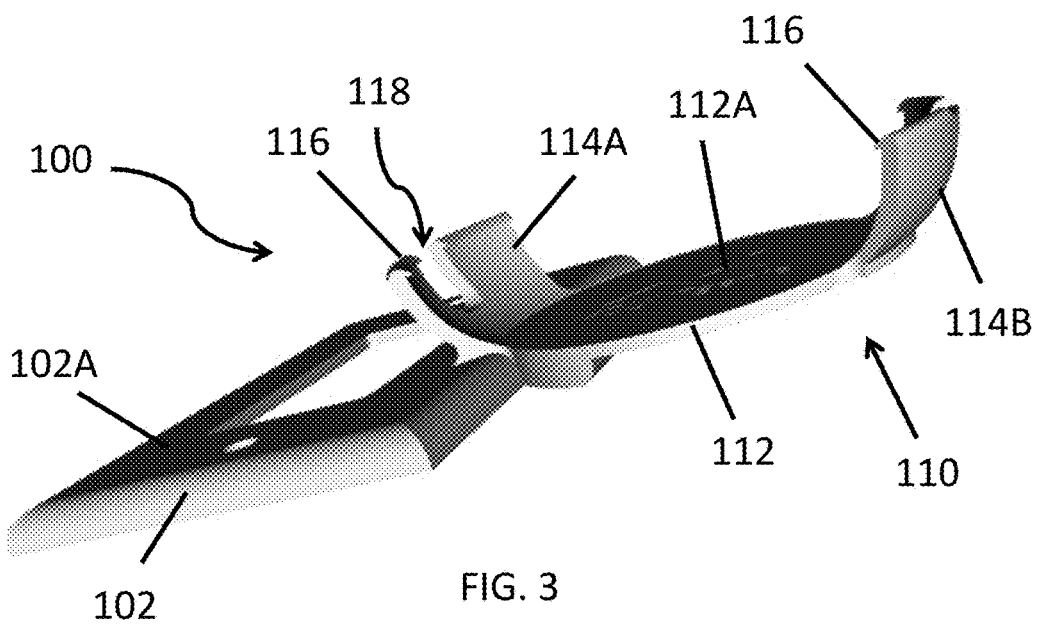
FIG. 3 illustrates a side perspective view of the integrated outlet cover and device support of FIG. 1.
Figure 4:
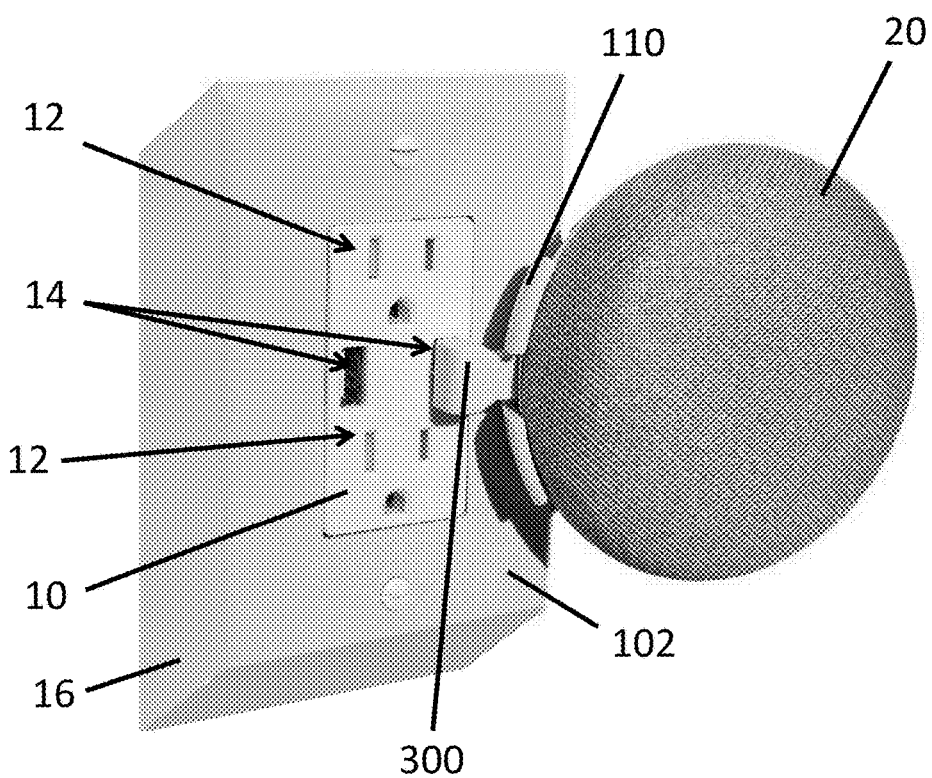
FIG. 4 illustrates another front perspective view of the integrated outlet cover and device support of FIG. 1 installed on an electrical outlet and supporting a voice assistant device.
Figure 5:
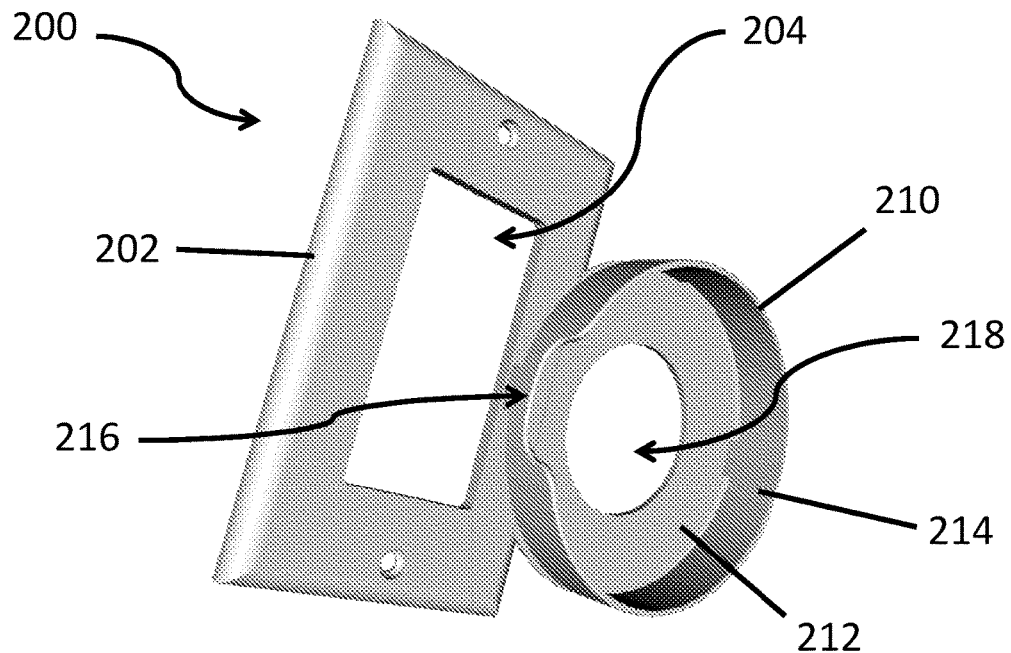
FIG. 5 illustrates a front perspective view of another embodiment of an integrated outlet cover and device support of the present invention.

FIGS. 1-4 illustrate one embodiment of an integrated outlet cover and device support 100 of the present invention (herein also referred to as the "unit" 100). The unit 100 includes an outlet frame 102 surrounding an opening 104 and a device support 110 on one edge of the frame 102. The opening 104 is formed in the center of the frame 102 such that, as illustrated in FIG. 4, an electrical box 16, wires, and all but the front of an outlet 10 are covered. In this way the unit 100 mounts to the electrical box 16, such as with screws, and replaces a conventional outlet cover plate. As further illustrated in FIG. 4, the type of outlet 10 for which the illustrated embodiment of the unit 100 is designed includes two sets of apertures 12 to receive the blades of an electrical plug and two USB ports 14 to receive USB plugs. Thus, the outlet 10 supplies both 110 volt AC power and 5 volt DC power. When the outlet is in the vertical orientation, as illustrated, the two sets of AC apertures 12 are spaced apart vertically and the two DC apertures 14 are spaced apart horizontally. It will be appreciated that the unit 100 and outlet 10 and those illustrated in FIGS. 5-8 are representative of two outlet combinations and that the present invention may be adapted to accommodate other configurations, including those that have multiple sets of electrical outlets and those that are combined with one or more switches.

The support 110 includes a circular base 112 and wings 114A, 114B (collectively identified as 114) curved outwardly from the base 112. The front surface 112A of the base 112 is substantially co-planar with the front surface 102A of the frame 102. Although the wings 114 are illustrated as extending from the sides of the base 112 (when oriented as illustrated), they may instead extend from the top and bottom of the base 112. Each of the wings 114, having a curved width less than the circumference of the base 112, only partially surrounds the base 112. In addition, although two wings 114 are shown in the Figures, other embodiments could include three, four, or more spaced apart wings 114 extending from the base 112.

Figure 1:
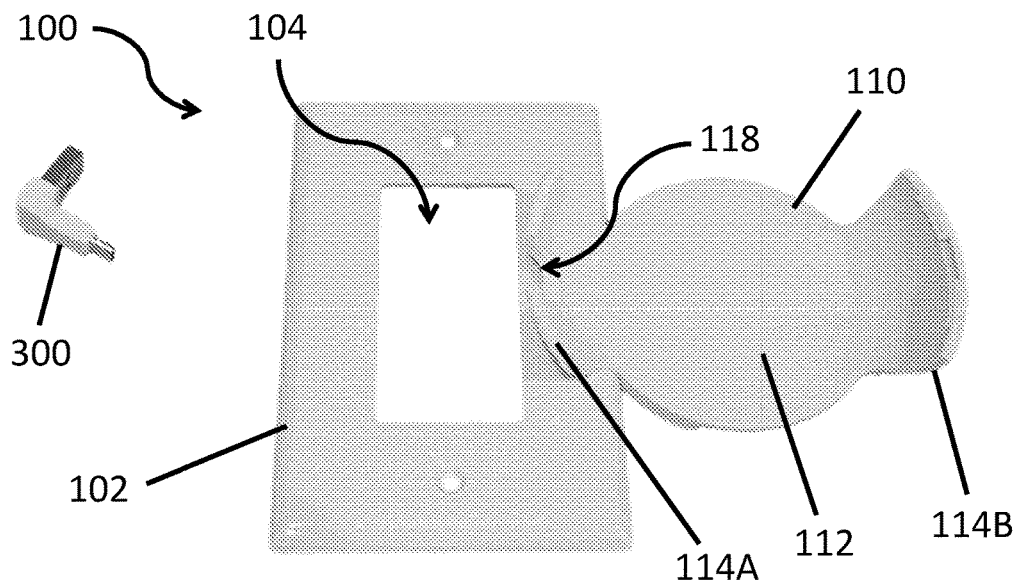
FIG. 1 illustrates a front perspective view of one embodiment of an integrated outlet cover and device support of the present invention.

FIG. 1 also shows a right-angle adapter 300 that may be used instead of a cable to connect an electronic device retained in the unit 100 with a USB port 14 in the outlet 10. While the configuration may differ depending upon the connector in the electronic device, one such configuration includes a USB-2-3 connector on one end and a micro-USB connector at the other end, offset by 90° from each other.

The rear view of the unit 100 illustrated in FIG. 2 shows the integration of the support 110 with the frame 102. The unit 100 may be formed as a single piece or as separate pieces joined with, for example, cement or a heat weld.

FIG. 3 is a side perspective view of the unit 100 in which the upper edges of the wings 114 are more readily visible. The upper edges may be formed into an inward-facing tooth-like retention clip 116 configured to clip into a gap around the perimeter of the electronic device 20 (FIG. 4) to retain the device 20 within the support 110. In an alternative embodiment, the wings 114 may use inward-directed tension to retain the device 20 within the support 110. In the embodiment of the unit 100 illustrated in FIGS. 1-4, the distance between the upper edges of the two wings 114A, 114B is greater than the diameter of the base 110.

The support 110 also may include a cutout 118 (FIGS. 1 and 3) in the wing 114 adjacent to the frame 102 enabling the right-angle adapter 300 to extend through the cutout 118. FIG. 4 illustrates the unit 100 with the frame 102 installed over an electrical outlet 10 and the support 110 retaining an electronic device 20. The adapter 300 is shown plugged into the electronic device 20 and a USB port 14. If the wings 114 are oriented vertically, the adapter 300 may extend between the wings 114 without a cutout 118.

Figure 6:
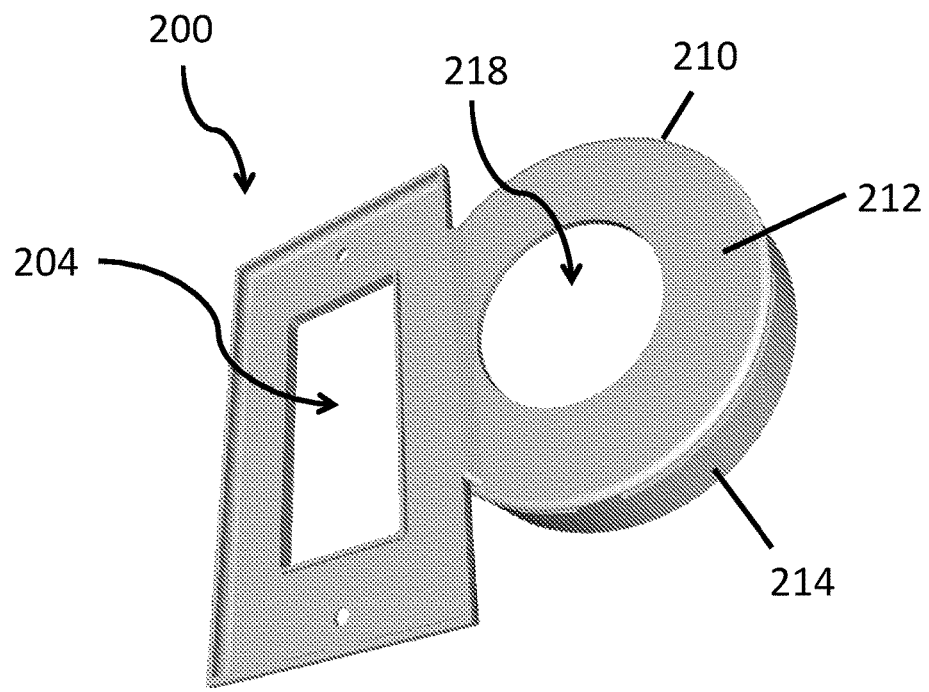
FIG. 6 illustrates a rear perspective view of the integrated outlet cover and device support of FIG. 5.
Figure 7:
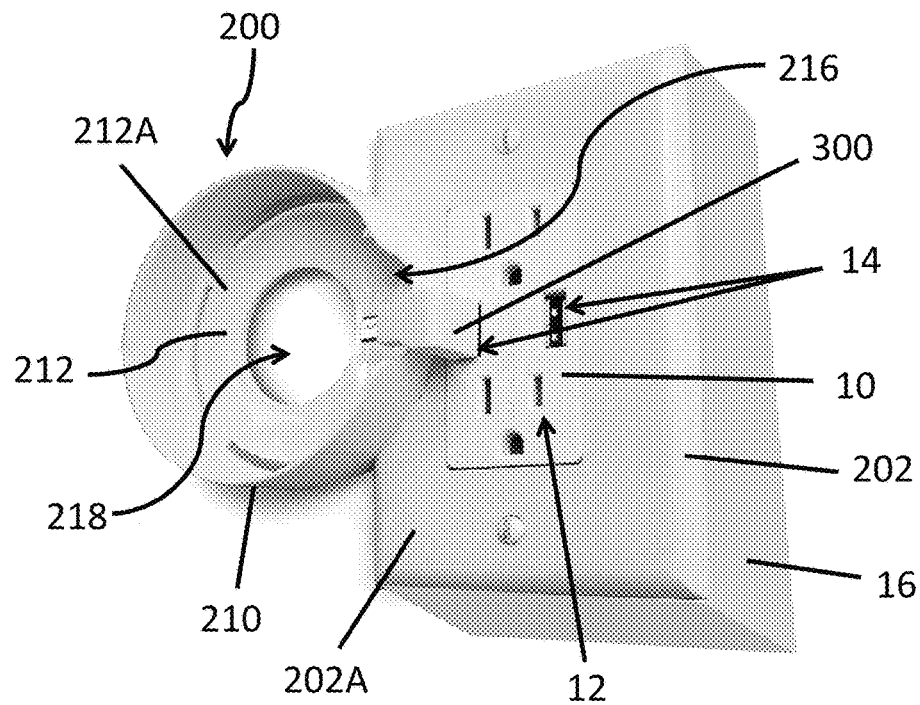
FIG. 7 illustrates a front perspective view of the integrated outlet cover and device support of FIG. 5 installed in an outlet.
Figure 8:
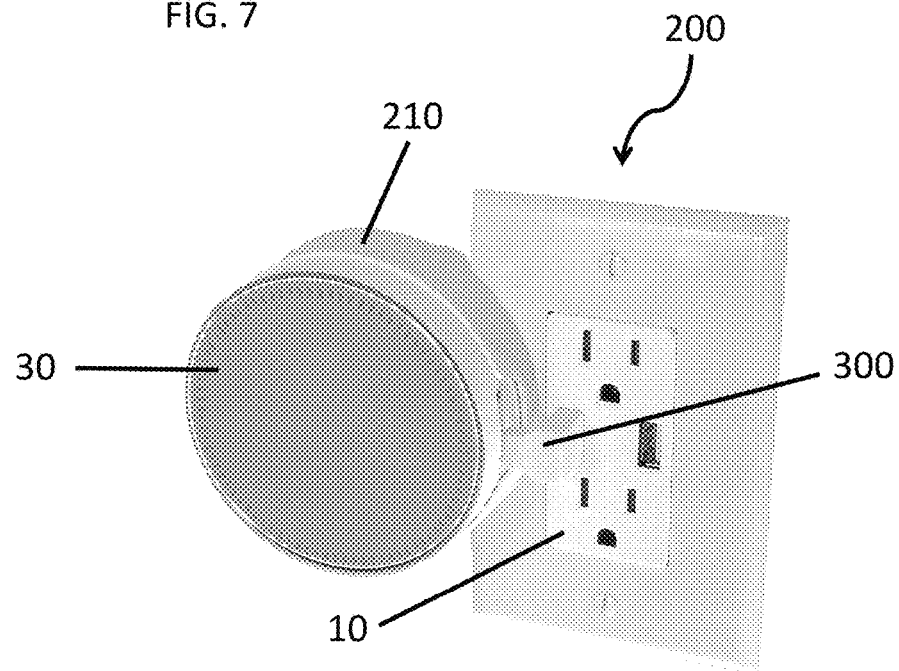
FIG. 8 illustrates a front perspective view of the integrated outlet cover and device support of FIG. 5 installed on an electrical outlet and supporting a different voice assistant device.

FIGS. 5-8 illustrate another embodiment of an integrated outlet cover and device support 200 of the present invention (herein also referred to as the "unit" 200). The unit 200 includes an outlet frame 202 surrounding an opening 104 and a device support 210. The opening 204 is formed in the center of the frame 202 such that, as illustrated in FIGS. 7 and 8, the electrical box 16, wires, and all but the front of the outlet 10 are covered. As with the unit 100, the unit 200 replaces a conventional outlet cover plate. As further illustrated in FIGS. 7 and 8, the type of outlet 10 for which the illustrated embodiment of the unit 200 is designed includes two sets of apertures 12 to receive the blades of an electrical plug and two USB ports 14 to receive USB plugs.

The support 210 includes a circular base 212 and a sidewall 214 extending outwardly from the perimeter of the base 212. The front surface 212A of the base 212 is substantially co-planar with the front surface 202A of the frame 202. Although the sidewall 214 is shown in the Figures as completely surrounding the base 212, in other embodiments the sidewall 214 could instead be multiple, separate sidewall pieces spaced-apart around the base 212.

The rear view of the unit 200 illustrated in FIG. 6 shows the integration of the support 210 with the frame 202. As with the unit 100, the unit 200 may be formed as a single piece or as separate pieces joined with, for example, cement or a heat weld.

The support 210 also may include a cutout 216 enabling the right-angle adapter 300 to extend through the cutout 216. FIG. 7 illustrates the unit 200 with the frame 202 installed around an electrical outlet 10 with the adapter 300 plugged into a USB port 14. FIG. 8 illustrates the support 210 retaining an electronic device 30.

The support 210 may also include one or more openings or sound ports 218 in the base 212. Because of the thickness of the frame 202, the rear of the base 212 is spaced from the wall. The openings 218 allow sound to reflect off the wall behind the base 212, enhancing the quality of sound from the speaker of the device 30 and to the microphone of the device 30.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An integrated electrical outlet cover and device support assembly, comprising:
    a frame to cover a front of an electrical box, the frame having a back surface, a front surface, and a plurality of walls surrounding an opening in which an electrical outlet or switch being exposed, the frame further having an outer perimeter;
    a circular base extending from a portion of one of the walls of the frame, the base having a front surface co-planar with a front surface of the frame;
    a first and second spaced-apart curved wings extending outward from a perimeter of the front surface of the base, each of the wings having a curved width less than the circumference of the base, a distance across the base between upper edges of the wings being greater than a diameter of the base, the first and second wings being on opposite sides of the base; and
    an inward-facing retention clip along upper edges of the wings with which a device is retainable between the clip and the base.

2. The integrated electrical outlet cover and device support of claim 1, further comprising a universal serial bus (USB) connector pluggable at a first end into a port on a side of the device and pluggable at a second end, at right angles to the first end, through a cutout in the first wing into a port in the electrical outlet.

3. The integrated electrical outlet cover and device support of claim 1, further comprising at least one sound port formed in the base.

* * * * *